United States Patent [19]

Hay, II

[11] 3,879,254

[45] Apr. 22, 1975

[54] FABRICATION APPARATUS FOR BUTT JOINING FOAM PLASTIC BILLETS

[75] Inventor: Robert A. Hay, II, Midland, Mich.

[73] Assignee: The Dow Chemical Company, Midland, Mich.

[22] Filed: Nov. 1, 1972

[21] Appl. No.: 302,835

[52] U.S. Cl. ............... 156/461; 156/304; 156/468; 156/499
[51] Int. Cl. .................... B31f 1/00; B29c 27/06
[58] Field of Search ........... 156/461, 464, 468, 499, 156/522, 552, 556, 545, 546, 157–159, 156/297–304, 502–507, 517, 324, 380; 264/47; 161/102, 104; 228/25, 26, 44, 49

[56] References Cited

UNITED STATES PATENTS

| 3,468,086 | 9/1969 | Warner | 161/102 X |
| 3,586,584 | 6/1971 | Wilkins | 156/502 |
| 3,671,355 | 6/1972 | Patmal | 156/324 |
| 3,769,124 | 10/1973 | Johnson | 156/304 X |

Primary Examiner—Charles E. Van Horn
Assistant Examiner—David A. Simmons
Attorney, Agent, or Firm—Robert B. Ingraham

[57] ABSTRACT

Billets or strips of thermoplastic synthetic resinous foam are butt joined and protective and reinforcing surfaces laminated thereto by means of apparatus described.

7 Claims, 3 Drawing Figures

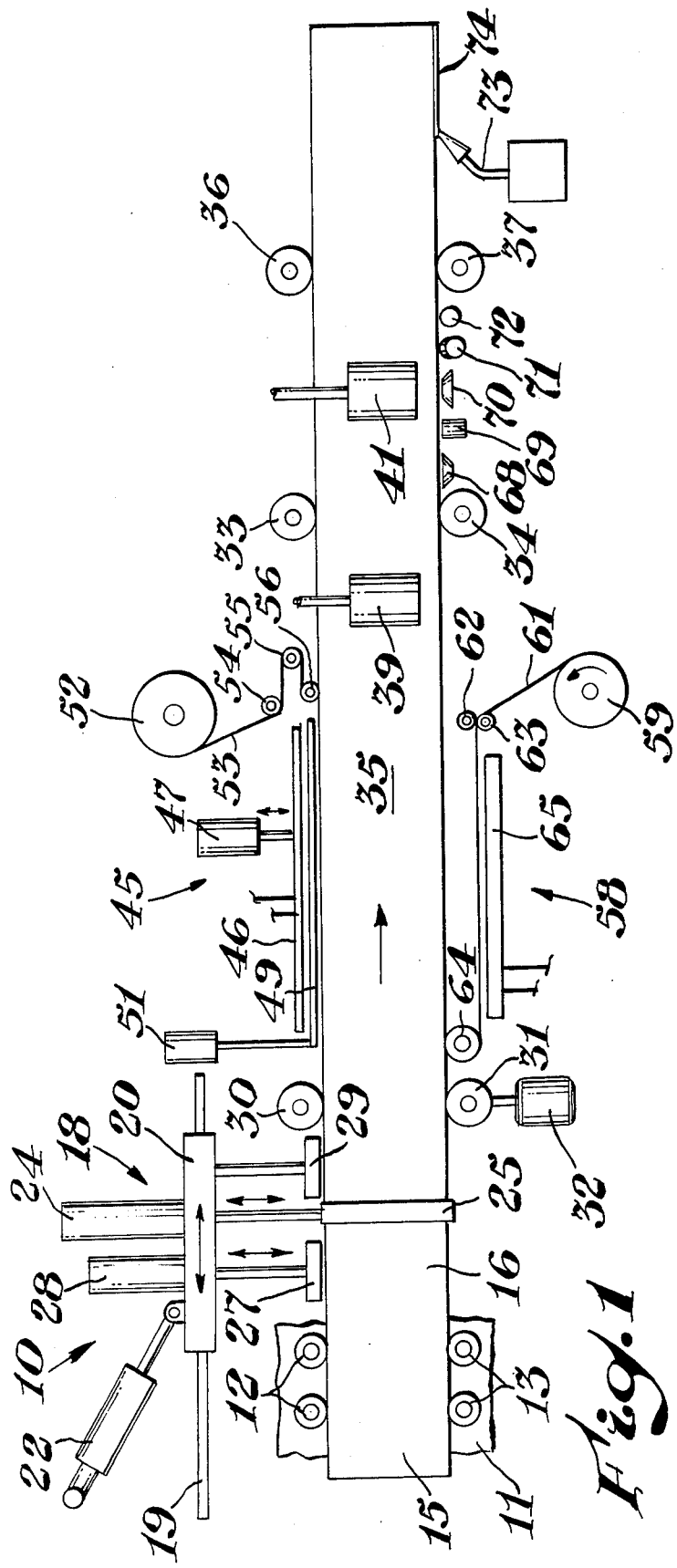
Fig. 1
Fig. 2
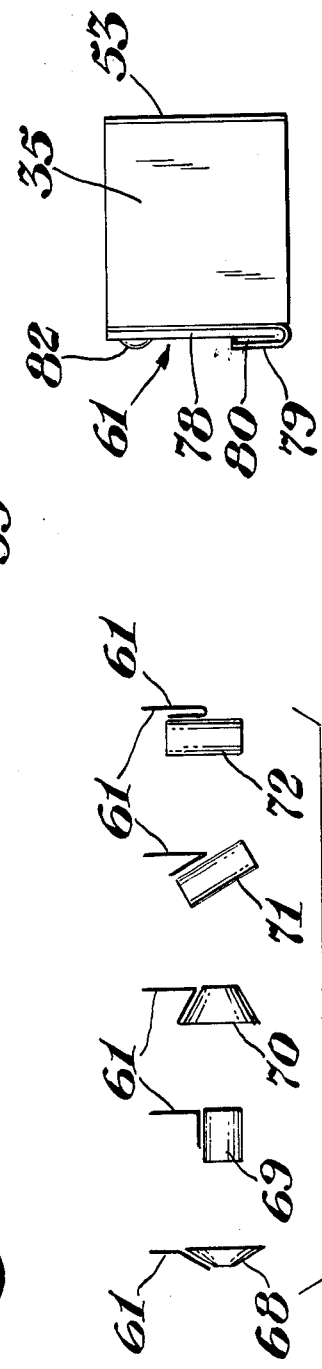
Fig. 3

FABRICATION APPARATUS FOR BUTT JOINING FOAM PLASTIC BILLETS

Walled structures are prepared from elongated foam plastic strips by depositing such strips in the form of a plurality of turns or loops and joining adjacent loops to form a self-supporting structure. Alternately, such a structure can be formed about an existing structure such as a container for cryogenic liquids by substantially similar techniques. Such spiral generation techniques are well known in the art and are set forth in U.S. Pat. Nos. 3,206,899; 3,337,384; 3,358,325; 3,372,430; 3,372,431; 3,376,602; 3,442,992 and 3,507,735. Although the elongate strips may be joined in end to end relationship adjacent the foam plastic depositing head, or first deposited and then the joint completed, it is highly desirable that strips of substantial length be employed. Generally it is desirable to use strips having a length much greater than the lengths generally commercially available. Although techniques are known for applying various reinforcements such as outer skins of diverse material to spirally generated structures, such lamination generally has been done after the deposition of the insulating material onto the structure. Such an operation necessitates the use of travelling laminating equipment which significantly complicates the spiral generation procedure and complicates the equipment which is required to be supported and moved about to form the desired structure and further additional material handling is required.

It would be desirable if there were available improved apparatus for the preparation of elongate synthetic resinous foam strips for use in a spiral generation procedure.

It would also be desirable if there were available an apparatus which would produce elongate foam strips for spiral generation procedure having a skin bonded thereto.

It would further be desirable if there were available an improved apparatus for the preparation of elongate strips of synthetic resinous foam suitable for construction purposes having desired reinforcement and a generally liquid impervious skin.

These features and other advantages in accordance with the present invention are achieved in an apparatus which comprises in cooperative combination a foam strip conveying means, a heat sealing means to butt weld adjacent ends of elongate foam material into a single length and laminating means to apply a desired reinforcement to at least a portion of one face of an elongate strip of insulating material.

Further features and advantages of the present invention will become more apparent from the following specification taken in connection with the drawing wherein:

FIG. 1 is a schematic representation of one embodiment of an apparatus in accordance with the present invention.

FIG. 2 is an illustration of the relative angular position of skin folding rolls of FIG. 1 taken generally along the line 2—2 thereof.

FIG. 3 is an end view of a foam plastic insulating billet in accordance with the present invention.

In FIG. 1 there is schematically depicted a fractional view of laminating apparatus in accordance with the present invention generally designated by the reference numeral 10. The apparatus 10 comprises in cooperative combination a frame or support means 11, partially shown. Supported on the frame 11 are a first pair of guide and feed rolls generally designated by the reference numeral 12 and a second pair of oppositely disposed guide and feed rolls 13. The guide or feed rolls 12 and 13 provide a first conveying or feed means. Disposed between the rolls 12 and 13 is a foam billet or strip 15 having a leading or terminal end 16. Generally adjacent the rolls 12 and 13 and in spaced relationship thereto is a heat sealing assembly 18. The assembly 18 comprises ways 19 affixed to the frame 11, a carriage 20 slidably mounted upon the ways 19 and adapted to slide in a direction generally parallel to the longitudinal axis of the strip 15. The carriage 20 has affixed thereto one end of a linear actuator 22 such as a pneumatic or hydraulic cylinder. The remaining end of the linear actuator 22 is affixed to the frame 11. By extension or retraction of the linear actuator the carriage 20 moves in the directions indicated by the double headed arrow. A heating platen linear actuator 24 is supported on the carriage 20. The linear actuator 24 advantageously is a hydraulic or pneumatic cylinder. The cylinder 24 has supported thereon remote from the carriage 20 a heating platen 25 which advantageously is electrically heated and has a corrugated configuration. Retraction or extension of the actuator 24 causes the heating platen 25 to be disposed either adjacent the end 16 of the insulation strip 15 or retracted therefrom. Motion of the linear actuator is generally in a plane normal to the longitudinal axis of the strip 15. A stop or shoe 27 is positioned generally adjacent the end 16 of the strip 15 and between the rolls 12 and the sealing platen 25 by means of a linear actuator 28, also a hydraulic or pneumatic cylinder. Motion of the shoe 27 is generally parallel to that of the heating platen 25 as indicated by the associated double headed arrow. A second fixed shoe or stop 29 is disposed adjacent the platen 25 and remote from the shoe 27. A second set of conveying rolls 30 and 31 or second conveying means are disposed generally adjacent the heating platen 25 and remote from the rolls 12 and 13. The rolls 30 and 31 are in operative combination with a drive means 32 such as a gearhead electric motor, also driving rolls 12 and 13. The drive rolls 30 and 31 serve to feed an insulation strip such as a strip 35 disposed therebetween. The strip 35 and the strip 15 are in generally coaxial arrangement. A set of guide rolls 33 and 34 are also in engagement with the strip 35. A third set of drive rolls 36 and 37 are disposed generally adjacent the rolls 33 and 34 and remote from the rolls 30 and 31. The rolls 36 and 37 also are driven by the power source 32. Disposed between the rolls 30 and 31 and 33 and 34 is a guide or hold down roll 39. A similar hold down roll 41 is disposed between the rolls 33 and 34 and 36 and 37. The hold down rolls 39 and 41 maintain the strip 35 in contact with an operating means such as a metal plate or roller conveyor, not shown. A first laminating assembly 45 is disposed generally between the rolls 30 and 33 on one side of the strip 35. The laminating means comprises a heating means 46 such as an electrically heated platen which is moveably supported on a linear actuator 47. The linear actuator 47, such as a hydraulic or pneumatic cylinder, moves the platen in a direction generally normal to the axis of the strip 35 and in a direction indicated by the associated double headed arrow. As depicted in FIG. 1, a heat shield 49 is disposed between the platen 46 and an adjacent surface of the strip 35. The heat shield 49 is supported by a rotary actuator 51 which selectively positions the heat shield 49 between the platen 46 and the adjacent surface of the strip 35, or alternately removes the heat shield therefrom. Beneficially, the heat shield 49 may be a metal plate such as aluminum or a cement/asbestos board. A flexible sheet supply means 52 is disposed adjacent the heating platen 46 and remote from the roll 30. The supply means 52 beneficially is a source of reinforcement such as glass fabric or open glass scrim designated by the reference numeral 53. The scrim 53 passes over rolls 54, 55 and 56. The roll 56 is resiliently tensioned against the surface of the strip 35 and presses the scrim 53 thereon. Generally oppositely disposed to the first laminating assembly 45 is a second laminating assembly 58. The laminating assembly 58 comprises a laminate supply source 59 which dispenses a laminate strip 61 to guide rolls 62 and 63. The laminate 61 passes from the guide rolls 63 to a resiliently tensioned applicator roll 64 which serves to press the laminate against the surface of the strip 35 opposite and generally parallel to the surface to which the scrim 53 is applied. A heating means 65, conveniently a radiant heater, is disposed generally between the rolls 63 and 64 adapted to heat the surface of the strip or laminate 61 which is remote from the scrim 53. The heating means 65 provides a means of activating a heat activable adhesive disposed on the surface of the strip or laminate 61. Five folding rolls 68, 69, 70, 71 and 72 are disposed generally between the rolls 34 and 37 and are adapted to engage a projecting edge of the strip 61 after it has been adhered to the strip 35. The co-action of the individual rolls with the strip 61 is depicted in FIG. 2. For clarity of illustration the associated portion of the strip 61 has been omitted from FIG. 1. An adhesive applicator 73 is disposed generally adjacent the rolls 37 and remotely disposed from the roll 34. The adhesive applicator 73 applies heat activable adhesive material 74 to the external surface of the strip 61 generally remotely disposed from the edge operated upon by the rolls 68, 69, 70, 71 and 72.

FIG. 3 is a schematic representation of an end view of the strip 35 of FIG. 1 having disposed on one side thereof the fibrous reinforcing scrim 53, the laminate 61 having a metallic layer 78 and a heat activable adhesive layer 79, a reverse folded portion 80 which has been accomplished by the rolls 68, 69, 70, 71 and 72 and a heat activable adhesive bead 82 on the surface of the laminate 61 and remotely disposed from the folded portion 80.

In operation of the apparatus as depicted in FIGS. 1, 2 and 3, the strip of appropriate thermoplastic synthetic resinous heat weldable foam such as the strip 15 is fed in between the rolls 12 and 13 with the platen 25 retracted toward the carriage 20 and the shoe 27 retracted. The strip 15 is forced between the rolls 30 and 31 until one end thereof is disposed generally adjacent the roll 64. The heat shield 49 is retracted and the heating platen 46 which has been previously heated is moved into position to heat the adjacent surface of the strip sufficiently to heat plastify it. The heater 65 heats the adjacent surface of the strip 61 to a temperature sufficient to activate the heat activable adhesive disposed on the surface thereof. The rolls 30 and 31 forward the strip at a predetermined rate while the laminate strip 61 is passed to the roll 64 at a linear rate equal to the progression rate of the strip 35 between the rolls 30 and 31. As the foam strip progresses, the roll 56 applies the reinforcing scrim 53 to the surface thereof. The strip then engages the roll 39 and subsequently the rolls 33 and 34 and is moved in the direction indicated by the arrow shown on the strip 35. The edge of the laminate 61 is generally flush with the upper surface of the strip 35 but projects a distance below the strip 35 then engages the rolls 68, 69, 70, 71 and 72 which serve to reverse fold the projecting edge in the manner shown in FIG. 2 to produce the reverse folded portion 80 depicted in FIG. 3. The strips pass between the rolls 36 and 37 wherein the hot melt adhesive 74 is applied by the adhesive dispenser 73 to provide a laminate having an end view generally as depicted in FIG. 3. When the end of the strip moving through the apparatus 10 approaches the rolls 12, the linear actuators 22, 28 and 24 are all in the retracted position placing the shoe and the platen 25 generally adjacent the rolls 12. When the end has passed the rolls 12, the platen 25 is extended and forced against the end of the strip by moving the carriage 20 in the direction of the roll 30. A fresh strip of insulating material such as the insulating material strip 15 as depicted in FIG. 1 is quickly passed between the rolls 12 and 13, butted against the platen 25 for a sufficient length of time to permit melting of the ends of the adjacent insulation strips. The shoe 27 is extended to engage the adjacent surface of the strip. The platen 25 is then withdrawn from between the strips and the ends forced together to form a heat seal or weld. Due to variations in density of various foams, frequently it is desirable to feed the incoming strip to the welder and rolls 12 and 13 manually. Generally the driving rolls 12 and 13 operate at surface speeds higher than the surface speeds of the rolls 30, 31, 33 and 34 to force the incoming strip against the platen 25 and the adjacent strip end when the platen is removed. However, the pressure of the rolls 12 and 13 on the foam should not be sufficiently great to cause damage to the insulation strip when slipping occurs on completion of the weld. In most instances motion of the shoe 27 is not necessary. Generally the shoe 27 is maintained in the extended position except when feed stock of irregular dimensions is being processed. The actuator 22 may be disconnected when the nature of the strip is such that pressure of the incoming strip is sufficient to move the carriage 20 and return of the carriage can be manual or by means of spring tension. Apparatus employing the operations as depicted in FIG. 1 have been found eminently satisfactory for butt welding, bonding glass scrim and plastic coated aluminum to rectangular polystyrene foam strips.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the butt joining of foam plastic billets, the apparatus comprising in cooperative combination a first conveying means, adapted to receive and continuously convey foam billets having a longitudinal axis a heat sealing means to butt weld adjacent ends of said foam billets into a single length foam billet, the heat sealing means being movable generally in a direction parallel to the longitudinal axis of said foam billets, the heat sealing means having a platen and means to dispose the platen adjacent to or retracted from adjacent ends of foam billets being conveyed, a second conveying means for the foam billet disposed adjacent the platen of the heat sealing means and remote from the first conveying means, a first laminating means to apply a desired reinforcement to at least a portion of one face of the butt joined foam billet.

2. The apparatus of claim 1 wherein the platen has a corrugated configuration.

3. The apparatus of claim 1 wherein the laminating means includes means to supply a reinforcing scrim.

4. The apparatus of claim 1 including means to fold an edge of the reinforcement applied to the foam billet.

5. The apparatus of claim 1 including at least one foam billet engaging shoe disposed adjacent the platen and movable generally parallel to the platen.

6. The apparatus of claim 1 including a heat activable adhesive applicator adapted to supply heat activable adhesive to the reinforcement.

7. The apparatus of claim 1 including a second laminating means oppositely disposed from the first laminating means.

* * * * *